United States Patent [19]

Luttner

[11] 4,139,281
[45] Feb. 13, 1979

[54] WEIGHT FOR SPECTACLE FRAME AND METHOD OF ATTACHMENT

[76] Inventor: George J. Luttner, 128 E. Second Ave., Latrobe, Pa. 15650

[21] Appl. No.: 798,039

[22] Filed: May 18, 1977

[51] Int. Cl.² .............................................. G02C 5/14
[52] U.S. Cl. ..................................... 351/111; 351/123; 351/158
[58] Field of Search .................... 351/111, 158, 123

[56] References Cited

U.S. PATENT DOCUMENTS

| | | | |
|---|---|---|---|
| 3,597,053 | 8/1971 | Mastman | 351/111 X |
| 3,768,892 | 10/1973 | Bidgood | 351/158 |

FOREIGN PATENT DOCUMENTS 0637543  5/1950  United Kingdom ................... 351/123

*Primary Examiner*—Paul A. Sacher
*Attorney, Agent, or Firm*—Albert L. Jeffers; John F. Hoffman

[57] ABSTRACT

A weight for use on a spectacle frame and a method of attaching in which a high density weight is provided which is relatively short in length and which has a slot-like recess in one side for receiving a portion of the rearward part of a spectacle bar is receivable. The weight is preferably cemented to the bar in a desired location rearward of the ear and counterbalances at least a portion of the weight of the foward lens-holding part of the frame. Alternatively, the weight can be adhered to the outwardly facing side of the rearward end of the side bar or earpiece of a spectacle frame. The weight is so attached to the side bar of the frame as to provide the greatest comfort to the wearer.

4 Claims, 7 Drawing Figures

WEIGHT FOR SPECTACLE FRAME AND METHOD OF ATTACHMENT

The present invention relates to a device for weighting the temple bar or earpiece of a spectacle frame and to a method of attaching a weight to the temple bar so as at least partly to balance the weight of the forward lens-holding portion of a spectacle frame.

The general idea of counterbalancing a spectacle frame as by utilizing weights on the temple bars thereof which are disposed rearwardly of the region of contact with the temple bars on the ears is known but, heretofore, certain defects have presented themselves in respect of such arrangements.

The weighting devices which heretofore have been provided have sometimes been expensive and bulky and have not added any stability to the spectacles with respect to the positioning thereof on the head.

Weight devices known in the prior art have also been defective in that they sometimes presented an uncomfortable contour and could, on occasion, pinch the ear of the wearer or chafe the region on the rearward side of the ear.

With the foregoing in mind, the primary objective of the present invention is the provision of a weight for mounting on the temple bar of a spectacle frame and a method of mounting the weight on the temple bar and which defects of prior art arrangements are eliminated.

It is a further object to provide a temple bar weighting device which offers advantages not heretofore available in that the weighting device tends to hold the temple bar and, therefore, the entire spectacle frame in a certain position on the head.

A still further object is the provision of a weight device for mounting on the temple bar of eyeglasses which is adaptable to substantially any type temple bar.

BRIEF SUMMARY OF THE INVENTION

According to the present invention, a weight is formed of high density material which is generally in the form of a cylinder with rounded ends and with a slot-like recess extending axially therealong. The slot-like recess is adapted for receiving the edge of the spatula portion disposed at the rearward end of the temple bar of a spectacle with cement being provided to hold the weight in place on the temple bar.

The weight is of such a size that it protrudes inwardly from the temple bar and engages the recess in the head disposed above and rearwardly of the ear thus forming a mechanical interlock of the spectacle frame with the head while simultaneously disposing the temple bar in a more comfortable position than it would otherwise occupy.

In a modification, the weight is formed in the form of a platelet that is adapted for being mounted on the side of the spatula portion of a temple bar at the rearward end thereof and may be either on the inside or the outside of the temple bar. When such a platelet is mounted on the inside of the temple bar, it holds the temple bar in a preferred position while simultaneously interlocking the temple bar with the aforementioned depression to be found in the head.

The exact nature of the present invention will become more clearly apparent upon reference to the following detailed specification taken in connection with the accompanying drawings in which.

DETAILED DESCRIPTION OF THE INVENTION

Figure 1:
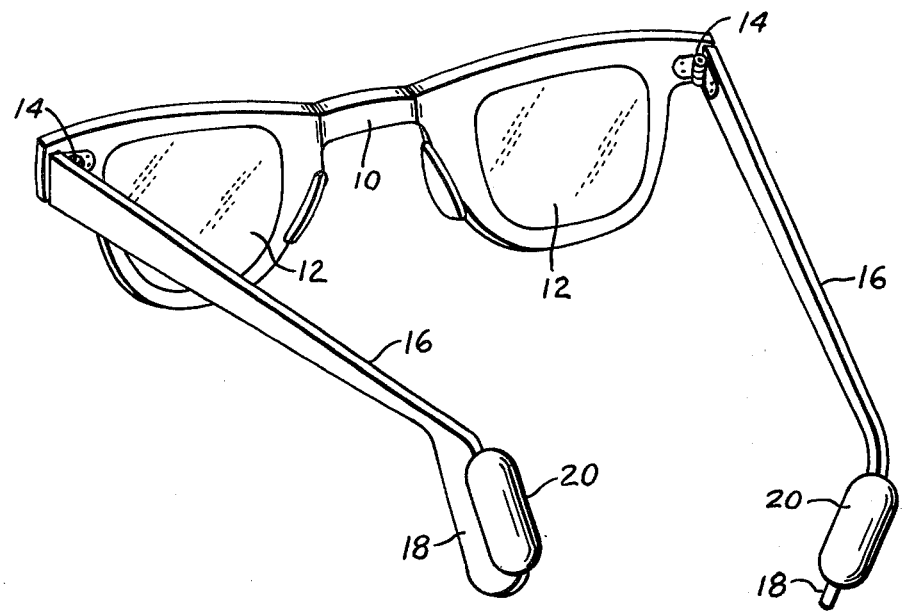
FIG. 1 is a perspective view showing an eyeglass frame having temple bars with weight elements according to the present invention.

Referring to the drawings somewhat more in detail, in FIG. 1, 10 is the portion of the spectacle frame in which lenses 12 are mounted. Hinges 14 are provided at the opposite ends of frame 10 and hingedly mounted thereon are the temple bars 16. The temple bars may be conventional and have spatula-like rearward ends at 18 which are disposed above and behind the ears when the spectacle frame is mounted on the head. According to the present invention, each spatula portion 18 of each temple bar 16 has a weight element 20 mounted thereon.

Figure 2:
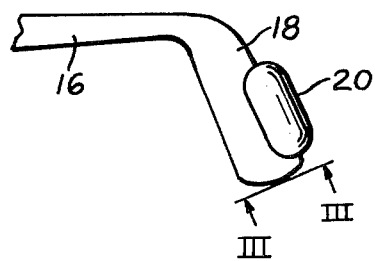
FIG. 2 is a view looking in at the rearward spatula portion of a temple bar showing the weight thereon.

A preferred position of the weight 20 of the temple bar is illustrated in FIG. 2 which is a side view of a rearward end of one of the temple bars.

Figure 3:
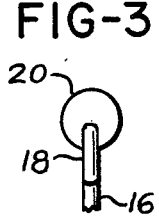
FIG. 3 is a sectional view indicated by line III—III on FIG. 2 showing more particularly the relationship of the weight to the temple bar.
Figure 4:
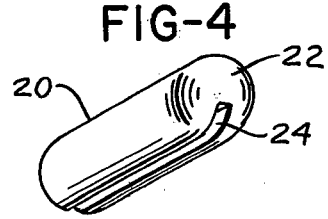
FIG. 4 is a perspective view showing the weight of FIGS. 1 to 3.

FIGS. 3 and 4 will show that each weight element 20 is substantially cylindrical with rounded ends 22 and with an axial slot-like recess 24 formed in one side. Recess 24 is adapted for receiving the edge of spatula portion 18 of a temple bar and a suitable cement, preferably a cement which is soluble in water, is employed for connecting the weight element to the temple bar. The use of a cement of the nature referred to permits the weight readily to be removed so that it can be shifted in position or so that it can be attached to another eyeglass frame.

Figure 5:
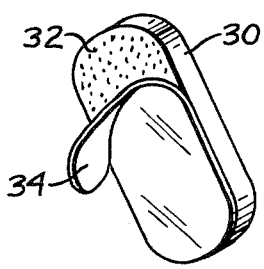
FIG. 5 is a perspective view showing a weight in the form of a platelet with adhesive on one side thereof.
Figure 6:
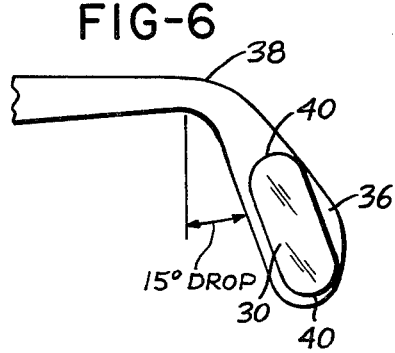
FIG. 6 is a view showing a platelet according to FIG. 5 mounted on the side of the rearward end of a spectacle frame temple bar.
Figure 7:
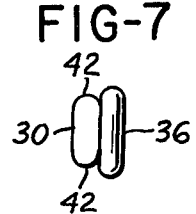
FIG. 7 is an end view of the temple bar of FIG. 6.

FIGS. 5, 6 and 7 show a weight element 30 in the form of a plate or platelet having adhesive 32 on one side covered by a peel-off strip 34. The platelet 30 is adapted for mounting on spatula portion 36 of a temple bar 38 as illustrated in FIGS. 6 and 7.

Advantageously, the platelet is mounted on the inner side of the temple bar so as to be receivable in the aforementioned recess to be found in the head above and behind the ear. At this end, the platelet 30 advantageously is rounded at the ends and along the side edges as indicated at 40 in FIG. 6 and 42 in FIG. 7.

The present invention has certain advantages over what has been done in the prior art, for example, the affixing of the weight so that it extends inwardly from the temple bar thus effecting a mechanical interlocking of the temple bar with the head. In addition to effecting the mechanical interlock referred to, it has been found that the inwardly protruding weight will hold the temple bar in at least slightly spaced relation from the head where the temple bar passes over the ear so that the temple bar is removed from engagement with an extremely tender portion of the head.

Rather, the temple bar engages the side of the ear toward the head and which is somewhat resilient so that eyeglasses equipped with counter weights in conformity with the present invention are more comfortable to wear than conventional eyeglasses.

Still further, counterbalancing weights in conformity with the prior art have been formed of a high density material which, presumably, comprises lead. The counter weights according to the present invention, on the other hand, are formed of a tungsten material which is over 1½ times as heavy as lead thus permitting the same counter weighting effect to be obtained from a smaller counter weight and providing greater freedom of design and formation of the counter weight.

The counter weights made with the high density material referred to, which may be tungsten and nickel, for example, permit the counter weights to be attached to the spectacle frame so as to be substantially inconspicuous. A mixture of the nature referred to might comprise tungsten with 5 percent by weight nickel, the ingredients being brought together in the form of fine powders and admixed with a wax to form a temporary binder according to conventional practices in the powdered metal art.

Material of this nature can be pressed substantially to the exact configuration desired and upon sintering in a hydrogen furnace or the like, a workpiece can be arrived at relatively inexpensively which requires no machining and which has the other advantages referred to above of high density and the like. The time consuming and expensive molding process that must be carried out to form lead counter weights is eliminated.

As mentioned, the counter weights according to the present invention are adapted for being adhered to the temple bar by an adhesive, preferably, an adhesive soluble in hot water so that the counter weights can be removed whenever desired to be remounted in another location on the same temple bar or on another temple bar.

The counter weight in the form of the platelet can be manufactured in the same way as described above and has substantially the same advantages as have been referred to in connection with the counter weight having the axial slot formed therealong as shown in FIGS. 1 to 4.

It will be noted, particularly on reference to FIG. 2, that the spatula portion 18 of the temple bar 16 shown is substantially wider than the depth of the slot formed in the weight element 20 which engages the upper region of the temple bar. The relationship of the weight to the temple bar described above has proved to be important because it permits the lower smooth edge of the temple bar to rest on the ear while the upper region of the temple bar which is enlarged by the provision of the weight mounted thereon is disposed in a region between the ear and the head and rearwardly of the top of the ear such that there is space to accommodate the bulk of the weight without the weight chafingly engaging the head or the ear.

The weight may, of course, and as mentioned above, fit within the recess to be found in the head above and rearwardly of the ear and, in this manner, physically interlock the spectacle frame with the head, but the engagement of the weight with the head will not be such as to induce any chafing or discomfort.

The rounded ends which will be seen on the weight element illustrated in FIGS. 2, 3 and 4 is of importance because this eliminates any sharp edges on the weight that could contribute to discomfort by the wearer. As has been mentioned, the weight can advantageously be formed of a heavy metal or alloy and, in this manner, permit an effective weight element to be made to relatively small dimensions.

The construction of the weight element with the longitudinal slot formed in the underside thereof permits the weight element to be adapted to a great many different types of temple bars and, furthermore, to be moved from one set of temple bars to another as might be desired.

Modifications may be made within the scope of the appended claims.

What is claimed is:
1. In combination:
an eyeglass frame having a forward lens supporting part and generally parallel temple bars pivotally connected to said lens supporting part at the ends thereof and adapted to extend rearwardly along the sides of the head and over the ears of the wearer,
each said temple bar including a generally straight portion and a spatula-like rearward end part angled downwardly relative to the respective straight portions so as to fit around the rear portion of the ears of the wearer,
each said end part having a lower edge extending from its juncture with the respective straight portion to the tip of said end part and adapted to rest on the ear,
counter weights of material having a density much higher than that of said temple bars secured to respective said end parts and extending generally along the longitudinal dimension of their respective end parts to points near the respective tips of said end parts,
said counter weights protruding inwardly toward each other from respective said end portions and being spaced from respective said lower edges so as to form a step in each of said end portions adapted to space said lower edges away from the head of the wearer in which said counter weight is mounted in its entirety on the head side of the respective spatula-like end part.

2. The combination according to claim 1 in which said counter weight is a pressed and sintered compact of powdered metal of which about 95 percent by weight is tungsten.

3. The combination according to claim 1 in which said counter weight is a pressed and sintered and unmachined compact of powdered metal of which about 95 percent by weight is tungsten and up to about 5 percent by weight nickel.

4. In combination:
an eyeglass frame having a forward lens supporting part and generally parallel temple bars pivotally connected to said lens supporting part at the ends thereof and adapted to extend rearwardly along the sides of the head and over the ears of the wearer,
each said temple bar including a generally straight portion and a spatula-like rearward end part angled downwardly relative to the respective straight portions so as to fit around the rear portion of the ears of the wearer,
each said end part having a lower edge extending from its juncture with the respective straight portion to the tip of said end part and adapted to rest on the ear,
counter weights of material having a density much higher than that of said temple bars secured to respective said end parts and extending generally along the longitudinal dimension of their respective end parts to points near the respective tips of said end parts, said counter weights protruding inwardly toward each other from respective said end portions and being spaced from respective said lower edges so as to form a step in each of said end portions adapted to space said lower edges away from the head of the wearer, said counter weights each comprising a generally cylindrical body having rounded ends and a longitudinal slot therein extending the entire length of said body, said slot having a depth not greater than about half the width of the respective end part, and said end part having an upper edge opposite said lower edge disposed within said slot and including hot water soluble cement in said counter weight slot.

* * * * *